(12) United States Patent
Huntley, Jr. et al.

(10) Patent No.: US 7,269,640 B2
(45) Date of Patent: Sep. 11, 2007

(54) METHODS AND SYSTEMS FOR MANAGEMENT AND CONTROL OF AN AUTOMATION CONTROL MODULE

(75) Inventors: William M. Huntley, Jr., Earlysville, VA (US); Carrie Brownhill, Earlysville, VA (US); Robert Chambers, Barboursville, VA (US); Misty Chambers, Barboursville, VA (US); David Collier, Charlottesville, VA (US); Ferrell Mercer, Earlysville, VA (US); Jason Kadingo, Palmyra, VA (US); Brad Bolfing, Charlottesville, VA (US)

(73) Assignee: GE FANUC Automation North America, Inc., Charlottesville, VA (US)

( * ) Notice: Subject to any disclaimer, the term of this patent is extended or adjusted under 35 U.S.C. 154(b) by 698 days.

(21) Appl. No.: 10/055,442

(22) Filed: Jan. 23, 2002

(65) Prior Publication Data

US 2003/0140133 A1 Jul. 24, 2003

(51) Int. Cl.
*G06F 15/177* (2006.01)
(52) U.S. Cl. .................. 709/220; 709/206; 709/217

(58) Field of Classification Search ................ 709/206, 709/207, 223, 224
See application file for complete search history.

(56) References Cited

U.S. PATENT DOCUMENTS

| | | | |
|---|---|---|---|
| 6,256,666 B1* | 7/2001 | Singhal | 709/217 |
| 6,539,419 B2* | 3/2003 | Beck et al. | 709/227 |
| 6,665,822 B1* | 12/2003 | Conway | 714/47 |
| 6,745,090 B1* | 6/2004 | Malizia, Jr. | 700/65 |
| 6,788,929 B2 | 9/2004 | Hymel | |
| 6,857,013 B2* | 2/2005 | Ramberg et al. | 709/223 |
| 6,961,700 B2 | 11/2005 | Mitchell et al. | |
| 2002/0123340 A1* | 9/2002 | Park | 455/424 |
| 2002/0169871 A1* | 11/2002 | Cravo de Almeida et al. | 709/224 |

* cited by examiner

*Primary Examiner*—Phuoc Nguyen
(74) *Attorney, Agent, or Firm*—Mark Conklin, Esq.; Armstrong Teasdale LLP

(57) ABSTRACT

An e-mail-enabled automation control module (ACM) includes an ACM and an e-mail subsystem electrically connected to the ACM. The e-mail subsystem is configured to perform at least one of sending e-mail messages from the ACM through a network and receiving e-mail messages from the network.

35 Claims, 9 Drawing Sheets

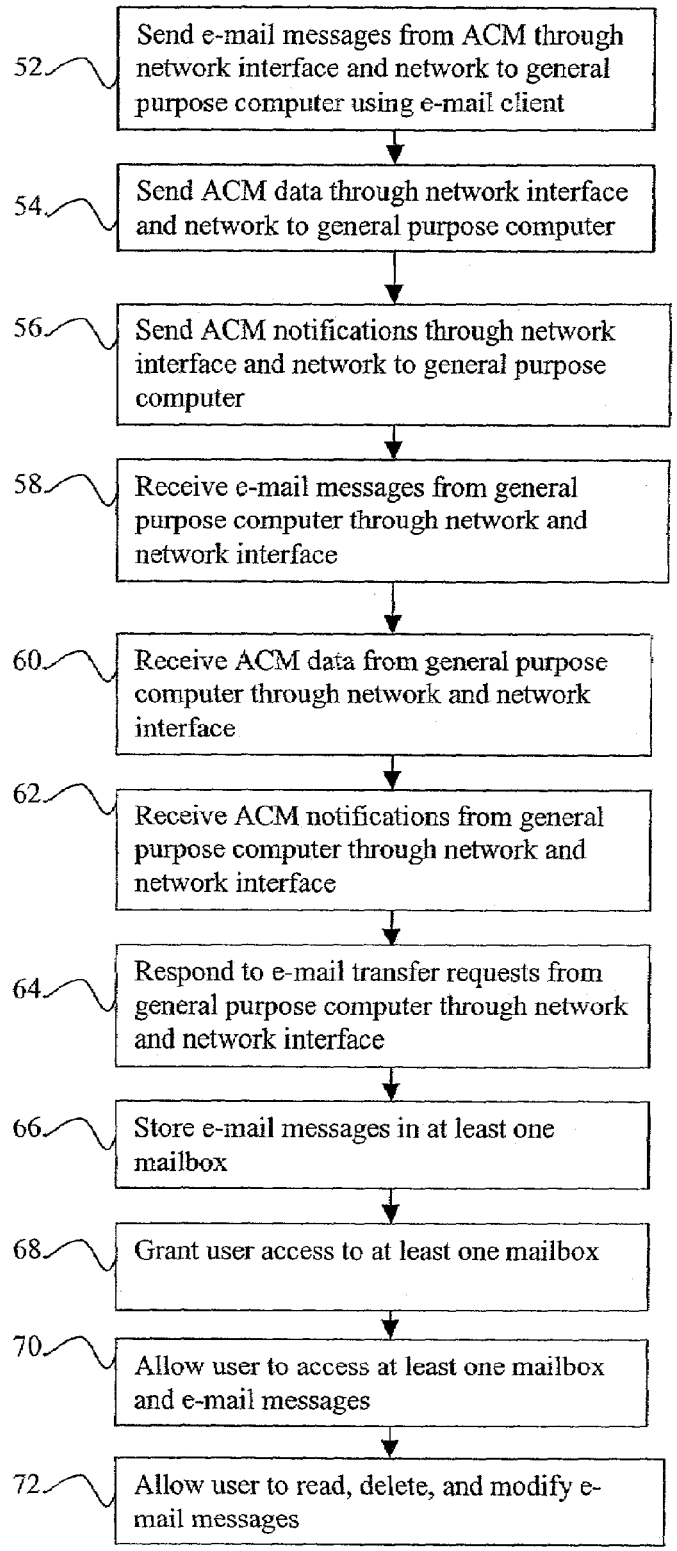

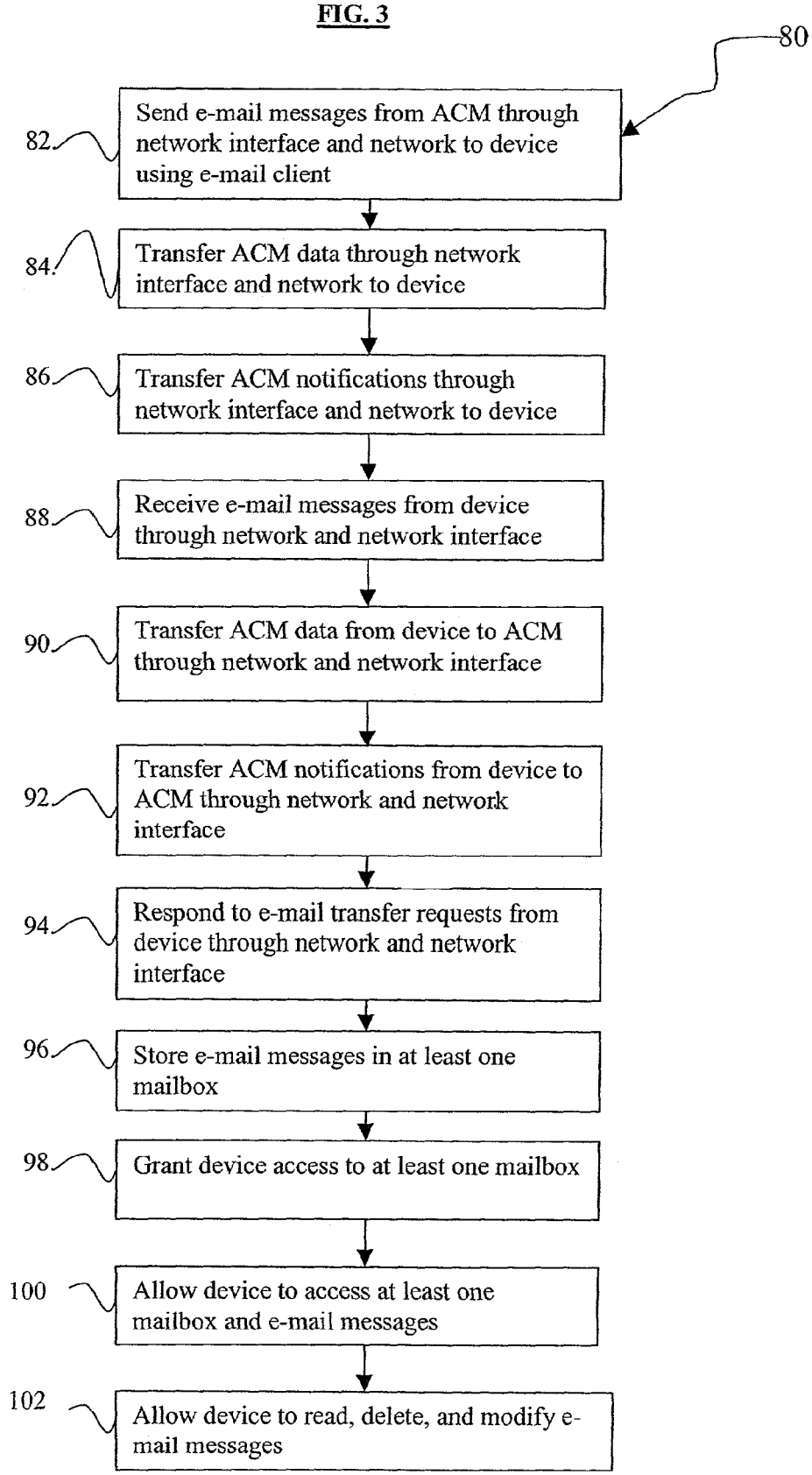

```
MIME-Version: 1.0
Date: Thursday, March 29, 2001  1:37 PM
From: My Name
Subject: Get %R values from ACM
Sender: my.name@cho.ge.com
To: my_ACM@my_ACM_URL
Content-Type: text/plain; charset=US-ASCII %R101 = <!--gef:getRefVal table=%R start_add=101 -->
%R102 = <!--gef:getRefVal table=%R start_add=102 -->
%R103 = <!--gef:getRefVal table=%R start_add=103 -->
%R104 = <!--gef:getRefVal table=%R start_add=104 -->
%R105 = <!--gef:getRefVal table=%R start_add=105 -->
%R106 = <!--gef:getRefVal table=%R start_add=106 -->
%R107 = <!--gef:getRefVal table=%R start_add=107 -->
%R108 = <!--gef:getRefVal table=%R start_add=108 -->
%R109 = <!--gef:getRefVal table=%R start_add=109 -->
%R110 = <!--gef:getRefVal table=%R start_add=110 -->
```

```
MIME-Version: 1.0
Date: Thursday, March 29, 2001  1:37 PM
From: My_ACM
Subject: Re: Get %R values from ACM
Sender: my_ACM@_ACM_URL
To: my.name@cho.ge.com
Content-Type: text/plain; charset=US-ASCII %R101 = 21
%R102 = 21000
%R103 = 31000
%R104 = 23000
%R105 = 19
%R106 = 66
%R107 = 17
%R108 = 8
%R109 = 99
%R110 = 1010
```

FIG. 4

```
MIME-Version: 1.0
Date: Thursday, March 29, 2001   1:37 PM
From: My Name
Subject: Register for New Fault Table Entry
Sender: my.name@cho.ge.com
To: my_ACM@my_ACM_URL
Content-Type: text/plain; charset=US-ASCII Notification Registration Number: <!--gef:notifyFltTblEntry value=oneShot-->
Rack:    <!-- gef:rackFlt table=ACM number=1 -->
Slot:    <!-- gef:slotFlt table=ACM number=1 -->
Description: <!-- gef:descriptionFlt table=ACM number=1 -->
Date:    <!-- gef:dateFlt table=ACM number=1 -->
Time:    <!-- gef:timeFlt table=ACM number=1 -->
Short/Long: <!-- gef:shortlongFlt table=ACM number=1 -->
Task#:   <!-- gef:taskACMFlt number=1 -->
Group#:  <!-- gef:groupFlt table=ACM number=1 -->
Action#: <!-- gef:actionFlt table=ACM number=1 -->
Error Code: <!-- gef:errorCodeACMFlt number=1 -->
Extra Fault Data: <!-- gef:extraFlt table=ACM number=1 -->
```

FIG. 5

```
MIME-Version: 1.0
Date: Thursday, March 30, 2001  10:09 PM
From: My Name
Subject: Register for New Fault Table Entry          ← 222
Sender: my.name@cho.ge.com
To: my_ACM@my_ACM_URL
Content-Type: text/plain; charset=US-ASCII Notification Registration Number: 229                ← 226
Rack: 0
Slot: 1
Description: LAN transceiver fault; OFF network until fixed
Date: 03-30-2001
Time: 22:09:48.000
Short/Long: 0
Task#: 0
Group#: 14
Action#: 2
Error Code: 454
Extra Fault Data: 0c 01 02 00 00 00 00 00 00 00 00 00 00 00 00 00 00 00 00 00 00 00 00 00 00 00 00 00 00 00 00 00 00 00 00 00 00 00 00 00 00
```

FIG. 6

```
MIME-Version: 1.0
Date: Thursday, March 29, 2001  1:37 PM
From: my_ACM
Subject: ACM Data Exchange
Sender: My_ACM@my_ACM URL
To: my_ACM2@my_ACM2_URL
Content-Type: text/plain; charset=US-ASCII <!--gef:setProtLevel level4Password= ACM@_password-->
<!--gef:setRefVal table=%R start_add=1 value=55-->
<!-my_ACM_URL\gef:setProtLevel level4Passwrd= my_password-->
<!-my_ACM_URL\gef:setRefVal table=%R start_add=2 value= <!--gef:getRefVal table=%R start_add=1 --> -->
```

⟵ 230

⟵ 234

```
MIME-Version: 1.0
Date: Thursday, March 29, 2001  1:37 PM
From: my_ACM2
Subject: RE:ACM Data Exchange
Sender: My_ACM2@my_ACM2_URL
To: my_ACM@my_ACM_URL
Content-Type: text/plain; charset=US-ASCII <!-my_ACM_URL\gef:setProtLevel level4Passwrd= my_password-->
<!- my_ACM_URL\gef:setRefVal table=%R start_add=2 value= 55 -->
```

```
MIME-Version: 1.0
Date: Thursday, April 2, 2001  9:21 PM
From: my_ACM
Subject: ACM Notification Registration
Sender: my_ACM@my_ACM_URL
To: my_ACM2@my_ACM2_URL
Content-Type: text/plain; charset=US-ASCII <!--gef:deregFltTblEntry value = 230-->
```

FIG. 9

METHODS AND SYSTEMS FOR MANAGEMENT AND CONTROL OF AN AUTOMATION CONTROL MODULE

BACKGROUND OF THE INVENTION

This invention relates generally to automation control modules (ACMs) and more particularly to management and control of ACMs.

Immediate notification is desired when certain critical events occur in a control system. For example, an ACM may be monitoring the dimensions on a part as part of an inspection process. If the dimensions trend toward becoming too large or too small, the ACM can detect these dimension errors, however, it must timely inform notification,of critical events. Furthermore, known methods and systems for automating and monitoring ACM communications and are not timely or ACM notifications, and permitting inter-ACM communications and are not timely or standardized. Accordingly, normal operation of known ACM systems can be difficult and time-consuming, thereby increasing development and maintenance of the ACM system software.

BRIEF DESCRIPTION OF THE INVENTION

In one aspect, an e-mail enabled automation control module (ACM) is provided that comprises an ACM and an e-mail subsystem electrically connected to the ACM. The e-mail subsystem is configured to perform at least one of sending e-mail messages from the ACM through a network, and receiving e-mail messages from the network.

In another aspect, a method is provided for management and control of an automation control module (ACM). The ACM includes an e-mail subsystem electrically connected to the ACM and a network. The method includes sending e-mail messages from the ACM through a network using the e-mail subsystem, and receiving e-mail messages from the network using the e-mail subsystem.

In another aspect, a method is provided for management and control of an automation control module (ACM) using an ACM system. The ACM system includes an ACM, a network, a general purpose computer electrically connected to the network, and an e-mail subsystem electrically connected to the ACM and the network. The method includes sending e-mail messages from the ACM through the network to the general purpose computer using the e-mail subsystem, and receiving e-mail messages from the general purpose computer through the network using the e-mail subsystem.

In yet a further aspect, an automation control module (ACM) system is provided. The system includes an ACM, a network, a general purpose computer electrically connected to the network, and an e-mail subsystem electrically connected to the ACM and the network. The e-mail subsystem is configured to perform at least one of sending e-mail messages from the ACM through the network to the general purpose computer, and receiving e-mail messages from the general purpose computer through the network.

BRIEF DESCRIPTION OF THE DRAWINGS

FIG. 2 is a flow chart illustrating one embodiment of a method for management and control of an automation control module using an ACM system.

FIG. 3 is a flow chart illustrating another embodiment of a method for management and control of an automation control module using an ACM system.

FIG. 4 is an example of an e-mail message requesting ACM data from an ACM CPU, and an e-mail message responding to the e-mail message requesting ACM data.

FIG. 5 is an example of an e-mail message registering for ACM notification.

FIG. 6 is an example of an e-mail message notification response to an e-mail message registering for ACM notification.

FIG. 7 is an example of an e-mail message for inter-ACM or device communication, and an e-mail message responding to the e-mail message for inter-ACM or device communication.

FIG. 9 is an example of an e-mail message that de-registers an ACM from ACM notifications from another ACM.

DETAILED DESCRIPTION OF THE INVENTION

Set forth below are descriptions of embodiments of methods and systems for control and management of an ACM. The methods and systems facilitate standard and timely methods for automating ACM data collection and control, notification of important ACM events, and inter-ACM communications and system diagnostics.

The methods and systems are not limited to the specific embodiments described herein. In addition, components of each system and steps of each method can be practiced independent and separate from other components and steps described herein. Each component and step can also be used in combination with other components and steps.

As used herein, the term ACM refers to any device that is used to control the automation of an activity, including but not limited to PLCs, computer numeric controls (CNCs), motion control products, home automation products, and commercial automation products, for example controls for automated teller machines or car wash systems. As used herein, ACM data includes different types of data within an ACM system 10 that control operation of ACM system 10. ACM data includes, but is not limited to, user logic programs, user program memory, ACM status and statistics, ACM faults, setting ACM operating states, setting privilege levels, and any other useful ACM information. As used herein, ACM notifications represent various event notifications that include, but are not limited to, change of digital input, output or internal memory states, crossing threshold for analog input, output or internal memory values, change in ACM state (run, stop, etc.), entry in fault table based on severity, fault table threshold detection and any other useful event that may require either customer or programmatic timely response.

Figure 1:
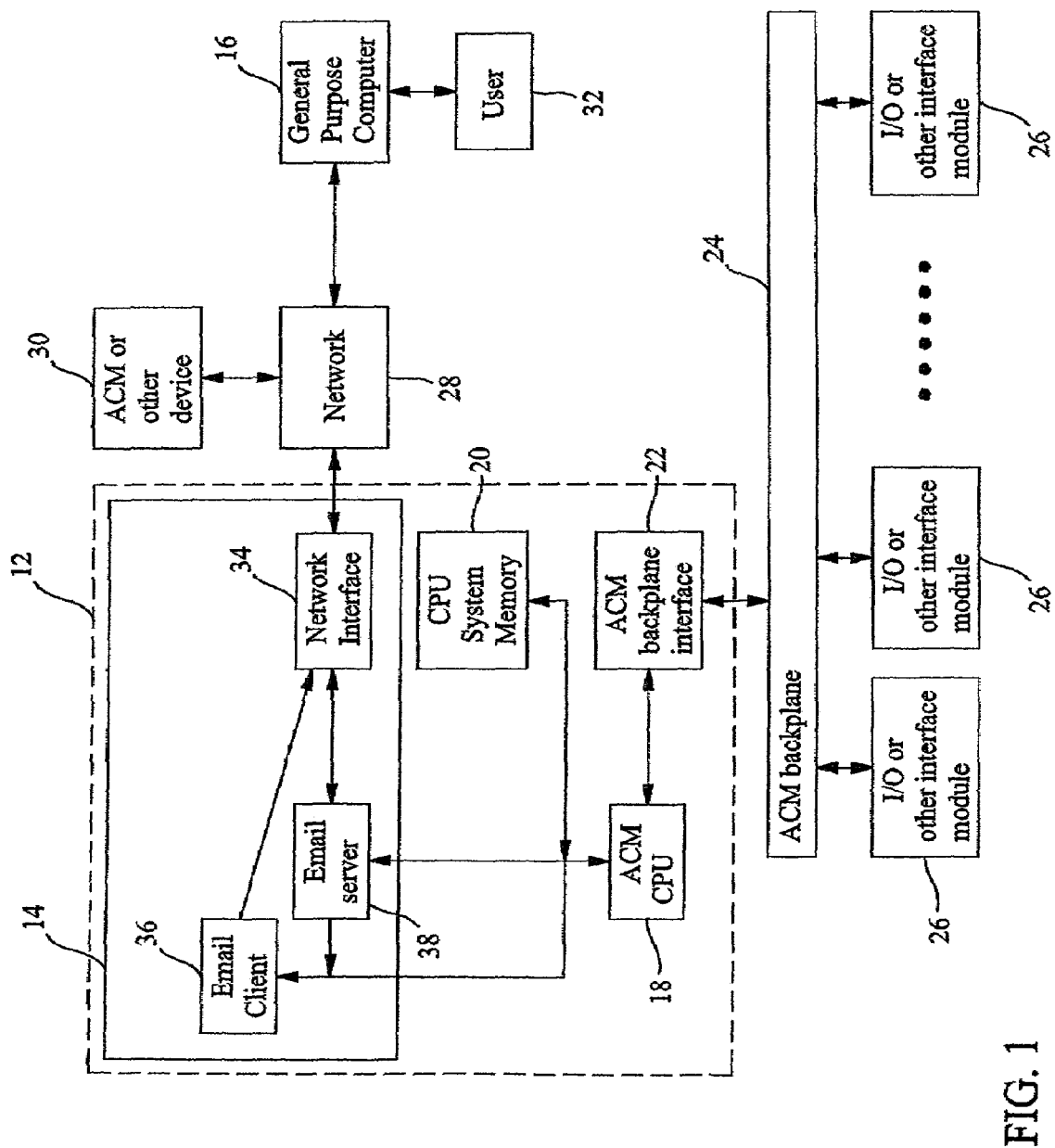
FIG. 1 is a block diagram illustrating one embodiment of an ACM system of the present invention.

FIG. 1 illustrates, in block diagram form, hardware architectures that can be utilized in conjunction with an ACM management and control system. Of course, the system can be implemented on many different platforms and utilize different architectures. The architecture illustrated in FIG. 1 is exemplary only.

FIG. 1 is a block diagram illustrating one embodiment of ACM system 10. System 10 includes an e-mail enabled ACM 12, an e-mail subsystem 14, and a general purpose computer 16. ACM 12 includes an ACM CPU 18 that carries out ACM functions, for example user logic and function block executions, input/output (I/O) scanning, and communications to other devices. ACM CPU 18 includes an CPU system memory 20 electrically connected to CPU 18 and, in one embodiment, contains both the operating system (not shown) for ACM CPU 18 and a user's program and data. In one embodiment, an ACM I/O backplane interface 22 is connected to ACM CPU 18, and provides an interface between ACM CPU 18 and an ACM backplane 24 connected to interface 22. ACM backplane 24 provides a physical and electrical means for connecting various I/0 or other input modules 26, for example communications or motion modules, into ACM 12. ACM backplane 24 facilitates the exchange of data between modules 26 and ACM CPU 18. In one embodiment, one or more modules 26 provide an interface for real world inputs (not shown), such as limit or proximity switch status, position of an object, temperature, or pressure, to ACM CPU 18 as parameters for logic or function block execution. In another embodiment, one or more modules 26 provide an interface to real world outputs (not shown) as commanded by ACM CPU 18 to control output devices (not shown), such as actuators, contactors, or solenoids.

General purpose computer 16 is electrically connected to a network 28, and sends e-mail messages to, and receives e-mail messages from, ACM 12. Network 28 provides the physical medium and intermediate devices (not shown), such as routers, and switches, that connect general purpose computer 16 and other devices 30 to ACM 12. In one embodiment, other devices 30 include one or more ACMs configured to send e-mail messages to, or receive e-mail messages from, ACM 12. In another embodiment, other devices 30 include one or more e-mail-enabled devices. E-mail messages may include ACM data, ACM notifications, and/or standard e-mail elements. For example, in one embodiment, specific command elements in the body of the e-mail instruct an e-mail server 38 to carry out specific actions such as transferring ACM data to ACM CPU 18, reading ACM data from ACM CPU 18, or registering with ACM 12 for notification when particular events or any other useful ACM action occurs. In one embodiment, network 28 is a wide area network (WAN), such as the Internet. In an alternative embodiment, network 28 is a local area network (LAN), such as an Intranet. A user 32 dials or directly logs on to an Intranet or the Internet to gain access to ACM 12. In one embodiment, general purpose computer 16 includes a web browser, and ACM 12 is accessible to general computer 16 via the Internet. General computer 16 is interconnected to the Internet through many interfaces including a different network (not shown), such as a WAN or a LAN, dial in connections, cable modems and special high-speed ISDN lines. General computer 16 is any device capable of interconnecting to the Internet, including a web-based telephone or other web-based connectable equipment.

E-mail subsystem 14 is electrically coupled to ACM CPU 18, CPU system memory 20, and network 28. E-mail subsystem 14 is shown in FIG. 1 to be embedded within ACM 12. In an alternative embodiment, e-mail subsystem 14 is contained in a separate module connected to backplane 24. E-mail subsystem 14 includes a network interface 34 that provides the lower level protocols (TCP/IP) and physical hardware connections to network 28. In one embodiment, e-mail subsystem 14 includes an e-mail client 36 that provides an interface to ACM 12 for ACM CPU 18 to send e-mail to general purpose computer 16 and other devices 30. E-mail client 36 is electrically connected to network interface 34 and ACM 12. E-mail client 36 builds an e-mail message and carries out the proper e-mail transport protocol to deliver the e-mail messages through network interface 34 and network 28 to general computer 16 or devices 30.

E-mail subsystem 14 includes e-mail server 38, which receives e-mail messages from network interface 34 and maintains one or more mailboxes (not shown) that contain mail messages received from general purpose computer 16 or devices 30, over network 28. In addition, e-mail server 38 parses mail messages for ACM specific functions to transfer ACM data to and from ACM CPU 18 or register devices 30 for notification of ACM events. When an ACM specific function is encountered, e-mail server 38 carries out the ACM specific function. If the function requires ACM data to be returned, e-mail server 38 retrieves the ACM data and transfers the ACM data to e-mail client 36 for delivery to user 32, other ACMs or devices 30, or another requester. Because e-mail server 38 transfers e-mail messages to and from other ACMs or devices 30, automatic actions occur without user 32 intervention, particularly when there is a supervisory ACM or device 30 that makes overall decisions or collects data for a group of ACMs or devices. The e-mail messages that e-mail server transfers to and from other ACMs or devices 30, in one embodiment, contain ACM data, ACM notifications, a request to register or de-register for notification with another ACM or device 30, or a notification to another ACM or device 30 that has already registered for notification. E-mail server 38 also manages the mailboxes and allows users 32 to access mail messages in the mailboxes. In one embodiment, e-mail server 38 allows users 32 to read, modify, and delete mail messages in the mailboxes for system diagnostics.

FIG. 2 illustrates one embodiment of a method 50 for management and control of ACM 12 (shown in FIG. 1) using ACM system 10 (shown in FIG. 1). Method 50 includes sending 52 e-mail messages from ACM 12 through network interface 34 (shown in FIG. 1) and network 28 (shown in FIG. 1) to general purpose computer 16 (shown in FIG. 1), using e-mail client 36 (shown in FIG. 1). In one embodiment, e-mail client 36 sends 54 ACM data through network interface 34 and network 28 to general purpose computer 16. In another embodiment, e-mail client 36 sends 56 ACM notifications through network interface 34 and network 28 to general purpose computer 16. E-mail server 38 (shown in FIG. 1) receives 58 e-mail messages from general purpose computer 16 through network 28 and network interface 34. E-mail server receives 60 ACM data from general purpose computer 16 through network 28 and network interface 34. In another embodiment, e-mail server receives 62 ACM notifications from general purpose computer 16 through network 28 and network interface 34.

E-mail server 38 responds 64 to e-mail transfer requests from general purpose computer 16 through network 28 and network interface 34. E-mail server includes at least one mailbox (not shown) and stores 66 e-mail messages in the at least one mailbox. E-mail server 38 grants 68 user 32 (shown in figure 1) access to the at least one mailbox and allows 70 user 32 to access the at least one mailbox and the E-mail messages stored therein. In one embodiment, e-mail server 38 allows 72 user 32 to read, modify, and delete the e-mail message stored within the at least one mailbox of e-mail server 38.

FIG. 3 illustrates one embodiment of a method 80 for management and control of ACM 12 (shown in FIG. 1) using ACM system 10 (shown in FIG. 1). Method 80 includes sending 82 e-mail messages from ACM 12 through network interface 34 (shown in FIG. 1) and network 28

(shown in FIG. 1) to device 30 (shown in FIG. 1), using e-mail client 36 (shown in FIG. 1). In one embodiment, e-mail client 36 transfers 84 ACM data from ACM 12 through network interface 34 and network 28 to device 30. In another embodiment, e-mail client 36 transfers 86 ACM notifications from ACM 12 through network interface 34 and network 28 to device 30. E-mail server 38 (shown in FIG. 1) receives 88 e-mail messages from device 30 through network 28 and network interface 34. In one embodiment, e-mail server transfers 90 ACM data from device 30 to ACM 12 through network 28 and network interface 34. In another embodiment, e-mail server transfers 92 ACM notifications from device 30 to ACM 12 through network 28 and network interface 34.

E-mail server 38 responds 94 to e-mail transfer requests from device 30 through network 28 and network interface 34. E-mail server includes at least one mailbox (not shown) and stores 96 e-mail messages in the at least one mailbox. E-mail server 38 grants 98 device 30 access to the at least one mailbox and allows 100 device 30 to access the at least one mailbox and the e-mail messages stored therein. In one embodiment, e-mail server 38 allows 102 device 30 to read, modify, and delete the e-mail messages stored within the at least one mailbox of e-mail server 38.

ACM system 10 provides a quick, easy, and standard mechanism for users and other ACMs or network devices to obtain ACM data and ACM notifications from ACM 12. As such, ACM system 10 reduces automation system implementation and maintenance costs by providing easy, standard and timely methods for automating ACM data collection and control, responding to ACM notifications, and facilitating inter-ACM communications.

EXAMPLES

FIG. 4 is an example of an e-mail message 200 requesting ACM data from ACM CPU 18 (shown in FIG. 1), and an e-mail message 202 responding to e-mail message 200. A header 204 contains the standard information such as MIME compliance, origin of the message, subject, date, and content type. The body 206 of e-mail message 200 includes a plurality of ACM request functions 208 requesting 10 memory values from CPU system memory 20. E-mail message 202 returns e-mail message 200, but replaces request functions 208 with ACM data 210.

FIG. 5 is an example of an e-mail message 220 registering for ACM notification. E-mail message 220 includes an ACM request function 224 that informs e-mail server 38 (shown in FIG. 1) to send an e-mail to the sender of e-mail 220 when a fault table entry (not shown) is added to an ACM 12 (shown in FIG. 1) fault table (not shown).

FIG. 6 is an example of an e-mail message 222 notification response to e-mail message 220 (shown in FIG. 5). E-mail message 222 returns e-mail message 220, but replaces request functions 224 with ACM data 226.

FIG. 7 is an example of an e-mail message 230 for inter-ACM or device communication, and an e-mail message 232 responding to e-mail message 230. E-mail message 230 includes a plurality of ACM function requests 234. E-mail message 232 returns e-mail message 230. E-mail server 38 (shown in FIG. 1) parses e-mail message 232 and sends a request to ACM CPU 18 (shown in FIG. 1) to perform the functions requested in function requests 234.

Figure 8:
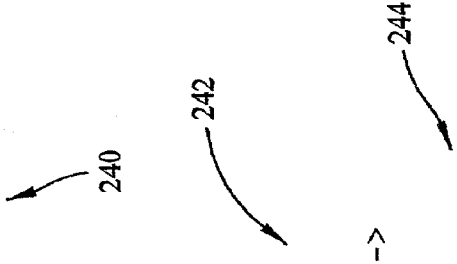
FIG. 8 is an example of an e-mail message registering an ACM for ACM notifications from another ACM, and an e-mail message containing ACM notifications from the other ACM.

FIG. 8 is an example of an e-mail message 240 registering ACM 12 (shown in FIG. 1) for ACM notifications from ACM 30 (shown in FIG. 1), and an e-mail message 242 containing ACM notifications 244 from ACM 30.

FIG. 9 is an example of an e-mail message 246 that de-registers ACM 12 (shown in FIG. 1) from ACM notifications from ACM 30 (shown in FIG. 1).

While the invention has been described in terms of various specific embodiments, those skilled in the art will recognize that the invention can be practiced with modification within the spirit and scope of the claims.

What is claimed is:

1. An e-mail-enabled automation control module (ACM) system comprising:
    an ACM; and
    an e-mail system electrically connected to said ACM that isconfigured to automatically control at least one device without user intervention and that is coupled to a backplane, said e-mail system configured to perform at least one of sending e-mail messages from said ACM through a network, and receiving e-mail messages from the network, said e-mail system comprises at least one mailbox configured to store at least one e-mail message, said e-mail system further configured to allow at least one of a user that is connected to said e-mail system through the network and the at least one device to perform at least one of read, modify, and delete the e-mail messages stored in said at least one mailbox, wherein the e-mail messages include at least one of ACM data and ACM notifications from at least one of another ACM and another device.

2. An ACM system in accordance with claim 1 wherein said e-mail system comprises a network interface configured for connection to the network.

3. An ACM system in accordance with claim 2 wherein said e-mail system comprises an e-mail client configured to send the e-mail messages through said network interface and the network.

4. An ACM system in accordance with claim 1 wherein said e-mail system comprises an e-mail server configured to perform at least one of receive the e-mail messages from the network, transfer the ACM data to and from said ACM, transfer the ACM notifications to and from said ACM, and receive and respond to e-mail transfer requests from the network.

5. An ACM system in accordance with claim 1 wherein said ACM comprises an ACM central processing unit (CPU) and a CPU system memory, said CPU configured to execute ACM functions.

6. An ACM system in accordance with claim 1 wherein said ACM comprises a backplane interface electrically connected to said ACM and said backplane electrically connected to said backplane interface, said backplane configured for connection with at least one of an input/output (I/O) module and an input module.

7. An ACM system in accordance with claim 6 wherein said e-mail system electrically connected to said backplane.

8. An ACM system in accordance with claim 1 wherein the at least one device is separate from said ACM.

9. An ACM system in accordance with claim 1 wherein the at least one device is coupled to said ACM via the backplane.

10. An ACM system in accordance with claim 1 wherein the at least one device is coupled to said ACM via the backplane and via an input/output module.

11. An ACM system in accordance with claim 1 wherein the at least one device is coupled to said ACM via the backplane, and the backplane is separate from said ACM.

12. A method for management and control of a first automation control module (ACM), the first ACM including an e-mail system electrically connected to the first ACM and a network, said method comprising:
- sending e-mail messages from the first ACM through the network using the e-mail system;
- receiving e-mail messages from the network using the e-mail system;
- storing the email messages from the first ACM and the email messages from the network in at least one mailbox;
- requesting, by the first ACM, information via the e-mail system from a second ACM, wherein the first ACM automatically controls a device without user intervention and is coupled to a backplane;
- granting at least one of a user on the network and the device access to the at least one mailbox; and
- allowing the user to perform at least one of read, modify, and delete the e-mail messages stored in the at least one mailbox, wherein the e-mail messages include at least one of ACM data and ACM notifications from at least one of another ACM and another device.

13. A method in accordance with claim 12 wherein the e-mail system comprises an e-mail client electrically connected to the first ACM and the network, and sending e-mail messages from the first ACM through the network using the e-mail system comprising sending e-mail messages from the first ACM through the network using the e-mail client.

14. A method in accordance with claim 13 wherein the e-mail system comprises an e-mail server electrically connected to the first ACM and the network, receiving e-mail messages from the network using the e-mail system comprising receiving e-mail messages from the network using the e-mail server.

15. A method in accordance with claim 14 wherein receiving e-mail messages from the network using the e-mail server comprising transferring the ACM data to and from the first ACM.

16. A method in accordance with claim 14 wherein receiving e-mail messages from the network using the e-mail server comprising transferring the ACM notifications to and from the first ACM.

17. A method in accordance with claim 14 wherein receiving e-mail messages from the network using the e-mail server comprising receiving and responding to e-mail transfer requests from the network.

18. A method for management and control of an automation control module (ACM) using an ACM system, the ACM system including a first ACM, a network, a general purpose computer electrically connected to the network, and an e-mail subsystem electrically connected to the first ACM and the network, said method comprising:
- sending e-mail messages from the first ACM through the network to the general purpose computer using the e-mail subsystem;
- receiving e-mail messages from the general purpose computer through the network using the e-mail subsystem;
- storing the email messages from the first ACM and the email messages from the general purpose computer in at least one mailbox;
- requesting information via the e-mail subsystem from a second ACM, wherein said requesting information is performed by the first ACM that is configured to automatically control at least one device without user intervention and that is coupled to a backplane;
- granting at least one of a user on the network and the at least one device access to the at least one mailbox; and
- allowing the user to perform at least one of read, modify, and delete the e-mail messages stored in the at least one mailbox, wherein the e-mail messages include at least one of ACM data and ACM notifications from at least one of another ACM and another device.

19. A method in accordance with claim 18 further comprising: transferring the ACM data to the first ACM from the e-mail subsystem; and
transferring the ACM data to the e-mail subsystem from the first ACM.

20. A method in accordance with claim 18 further comprising: transferring the ACM notifications to the first ACM from the e-mail subsystem; and
transferring the ACM notifications to the e-mail subsystem from the first ACM.

21. A method in accordance with claim 18 wherein the system further comprises at least one other ACM electrically connected to the network, said method further comprising:
- sending the ACM data to the at least one other ACM through the network using the e-mail subsystem; and
- receiving the ACM data from the at least one other ACM through the network using the e-mail subsystem.

22. A method in accordance with claim 18 wherein the system further comprises at least one other ACM electrically connected to the network, said method further comprising:
- sending the ACM notifications to the at least one other ACM through the network using the e-mail subsystem; and
- receiving the ACM notifications from the at least one other ACM through the network using the e-mail subsystem.

23. An automation control module (ACM) system comprising:
- an ACM;
- a network;
- a general purpose computer electrically connected to said network; and
- an e-mail subsystem electrically connected to said network and said ACM, wherein said ACM is configured to automatically control at least one device without user intervention and is coupled to a backplane, said e-mail subsystem configured to perform at least one of sending e-mail messages from said ACM through said network to said general purpose computer and receiving e-mail messages from said general purpose computer through said network, said e-mail subsystem comprises at least one mailbox configured to store at least one e-mail message, said e-mail subsystem further configured to allow at least one of a user that is connected to said e-mail subsystem through the network and the at least one device to perform at least one of read, modify, and delete the e-mail messages stored in said at least one mailbox, wherein the e-mail messages include at least one of ACM data and ACM notifications from at least one of another ACM and another device.

24. A system in accordance with claim 23 wherein said e-mail subsystem further configured to receive e-mail messages from said network.

25. A system in accordance with claim 23 wherein said e-mail subsystem further configured to transfer the ACM data to and from said ACM.

26. A system in accordance with claim 23 wherein said e-mail subsystem further configured to transfer the ACM notifications to and from said ACM.

27. A system in accordance with claim 23 wherein said e-mail subsystem further configured to receive and respond to e-mail transfer requests.

28. A system in accordance with claim 23 wherein said network is the Internet.

29. A system in accordance with claim 23 further comprising at least one other ACM electrically connected to the network, said e-mail subsystem further configured to:
  send the ACM data to said at least one other ACM through said network; and
  receive the ACM data from said at least one other ACM through said network.

30. A system in accordance with claim 23 further comprising at least one other ACM electrically connected to said network, said e-mail subsystem further configured to:
  send the ACM notifications to said at least one other ACM through said network; and
  receive the ACM notifications from said at least one other ACM through said network.

31. A system in accordance with claim 23 further comprising at least one other device electrically connected to said network, said e-mail subsystem further configured to:
  send e-mail messages to said at least one other device through said network; and
  receive e-mail messages from said at least one other device through said network.

32. An ACM system in accordance with claim 23 wherein said e-mail subsystem embedded within said ACM.

33. An ACM system in accordance with claim 23 further comprising a backplane interface electrically connected to said ACM and said backplane electrically connected to said backplane interface, said backplane configured for connection with at least one of an input/output (I/O) module and an input module.

34. An ACM system in accordance with claim 33 wherein said backplane interface embedded within said ACM.

35. An ACM system in accordance with claim 33 wherein said e-mail subsystem electrically connected to said backplane.

* * * * *